(12) United States Patent
Wei (10) Patent No.: US 9,798,175 B2
(45) Date of Patent: Oct. 24, 2017

(54) COMPOSITE SUBSTRATE AND METHODS FOR MANUFACTURING THE SAME, AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventor: Sifan Wei, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 251 days.

(21) Appl. No.: 14/918,506

(22) Filed: Oct. 20, 2015

(65) Prior Publication Data
US 2017/0003543 A1    Jan. 5, 2017

(30) Foreign Application Priority Data

Jun. 30, 2015   (CN) .......................... 2015 1 0374913

(51) Int. Cl.
*G02F 1/1335*    (2006.01)
*G02F 1/1333*    (2006.01)
(Continued)

(52) U.S. Cl.
CPC ......... *G02F 1/133308* (2013.01); *G02B 1/08* (2013.01); *G02F 1/1368* (2013.01);
(Continued)

(58) Field of Classification Search
CPC ........ G02F 2001/133545; G02F 2001/133548; G02F 2001/133538
See application file for complete search history.

(56) References Cited

U.S. PATENT DOCUMENTS

2005/0074565 A1    4/2005 Cok
2009/0104832 A1    4/2009 Fu et al.
(Continued)

FOREIGN PATENT DOCUMENTS

CN    101515091 A    8/2009
CN    101988973 A    3/2011
(Continued)

OTHER PUBLICATIONS

Chinese Application No. 201510374913.4, First Office Action dated Jun. 28, 2017.

*Primary Examiner* — Phu Vu
(74) *Attorney, Agent, or Firm* — Alston & Bird LLP (57) ABSTRACT

Provided are a liquid crystal display panel, a composite substrate and a method for fabricating the composite substrate. The composite substrate includes: a substrate, multiple electrodes insulated from each other and a carbon nanotube layer arranged on a surface of the substrate. The carbon nanotube layer is divided into multiple blocks insulated from each other in a plane where the carbon nanotube layer is located. Each block includes multiple carbon nanotubes extending in a same direction, and the extending directions of the carbon nanotubes in at least two blocks are different. Each of the electrodes is electrically connected to a respective block of a plurality of blocks.

20 Claims, 8 Drawing Sheets

(51) Int. Cl.
*G02F 1/1368* (2006.01)
*G02B 1/08* (2006.01)
*G02F 1/1343* (2006.01)

(52) U.S. Cl.
CPC .... *G02F 1/13439* (2013.01); *G02F 1/133345* (2013.01); *G02F 1/133514* (2013.01); *G02F 1/133528* (2013.01); *G02F 2001/133334* (2013.01); *G02F 2001/133538* (2013.01)

(56) References Cited

U.S. PATENT DOCUMENTS

| | | |
|---|---|---|
| 2014/0022638 A1 | 1/2014 | Wu |
| 2016/0109754 A1* | 4/2016 | Seike ................ G02F 1/133528 349/96 |
| 2016/0238766 A1 | 8/2016 | Huang et al. |
| 2017/0219754 A1* | 8/2017 | Di ........................ G02B 5/3058 359/485.05 |

FOREIGN PATENT DOCUMENTS

| | | |
|---|---|---|
| CN | 102207575 A | 10/2011 |
| CN | 103576370 A | 2/2014 |
| CN | 104698524 A | 6/2015 |

\* cited by examiner

COMPOSITE SUBSTRATE AND METHODS FOR MANUFACTURING THE SAME, AND LIQUID CRYSTAL DISPLAY PANEL

CROSS REFERENCE TO RELATED APPLICATIONS

The present application claims the priority to Chinese Patent Application No. 201510374913.4, titled "COMPOSITE SUBSTRATE AND METHOD FOR FABRICATING THE SAME, AND LIQUID CRYSTAL DISPLAY PANEL", filed on Jun. 30, 2015 with the State Intellectual Property Office of the People's Republic of China, the content of which is incorporated herein by reference in its entirety.

FIELD OF THE INVENTION

The present disclosure relates to the technical field of display devices, and in particular, to a liquid crystal display panel, a composite substrate and a method for fabricating the composite substrate.

BACKGROUND OF THE INVENTION

At present, a liquid crystal display, as one of mainstream display devices, is widely applied in various electronic products and is a necessary tool in people's work and daily life, since it has advantages such as ultrathin, displayable with a large-sized panel, a low power consumption, non-radiation and a high resolution.

A conventional liquid crystal display panel generally includes an upper polarizer and a lower polarizer. A polarization direction of the upper polarizer is perpendicular to a polarization direction of the lower polarizer. The two polarizers together with liquid crystal molecules control a light to pass through the two polarizers, thereby displaying an image.

However, the application field of conventional liquid crystal display panel is limited since it is difficult to achieve local polarization.

BRIEF SUMMARY OF THE INVENTION

In order to address the above issues, a liquid crystal display panel, a composite substrate and a method for fabricating the composite substrate are provided according to embodiments of the present disclosure, so as to achieve a local polarization for the liquid crystal display panel.

Therefore, the following technical solutions are provided according to the present disclosure.

A composite substrate includes: a substrate, a plurality of electrodes insulated from each other and a carbon nanotube layer arranged on a surface of the substrate, wherein the carbon nanotube layer is divided into multiple blocks insulated from each other in a plane where the carbon nanotube layer is located; each of the multiple blocks includes multiple carbon nanotubes extending in a same direction and the extending directions of the multiple carbon nanotubes in at least two of the multiple blocks are different; and each of the multiple electrodes is electrically connected to a respective one of the multiple blocks.

A liquid crystal display panel is further provided according to the present disclosure, The liquid crystal display panel includes: a TFT array substrate and a color filter substrate arranged opposite to each other, a liquid crystal layer arranged between the TFT array substrate and the color filter substrate; and the liquid crystal display panel further includes multiple electrodes insulated from each other and a carbon nanotube layer, where the carbon nanotube layer is divided into multiple blocks insulated from each other in a plane where the carbon nanotube layer is located; each of the multiple blocks includes multiple carbon nanotubes extending in a same direction and the extending directions of the carbon nanotubes in at least two of the multiple blocks are different; and each of the multiple electrodes is electrically connected to a respective one of the multiple blocks.

A composite substrate is provided according to the present disclosure. The composite substrate includes: a substrate, multiple first electrodes insulated from each other, multiple second electrodes insulated from each other, a first carbon nanotube layer and a second carbon nanotube layer, wherein the first carbon nanotube layer is arranged on a first surface of the substrate, the second carbon nanotube layer is arranged on a second surface of the substrate, and the first surface is opposite to the second surface; and the first carbon nanotube layer includes multiple carbon nanotubes extending in a first direction and is divided into multiple first blocks insulated from each other in a plane where the first carbon nanotube layer is located, and each of the multiple first electrodes is electrically connected to a respective one of the multiple first blocks; the second carbon nanotube layer includes multiple carbon nanotubes extending in a second direction intersecting with the first direction and is divided into multiple second blocks insulated from each other in a plane where the second carbon nanotube layer is located, and each of the multiple second electrodes is electrically connected to a respective one of the multiple second blocks; a projection of the first carbon nanotube layer onto a surface of the substrate does not overlap a projection of the second carbon nanotube layer onto the surface of the substrate in a direction perpendicular to the substrate.

A liquid crystal display panel is provided according to the present disclosure. The liquid crystal display panel includes: a TFT array substrate and a color filter substrate arranged opposite to each other, a liquid crystal layer arranged between the TFT array substrate and the color filter substrate. The liquid crystal display panel further includes the composite substrates as described above. The number of the composite substrate is one or two, in a case that the number of the composite substrate is one, the composite substrate is arranged on a surface of the TFT array substrate or a surface of the color filter substrate. In a case that the number of the composite substrate is two, one of the composite substrates is arranged on the surface of the TFT array substrate and the other of the composite substrates is arranged on the surface of the color filter substrate.

A method for fabricating a composite substrate is further provided according to the present disclosure. The method includes:

preparing a substrate;

preparing a first carbon nanotube layer and laying the first carbon nanotube layer on a surface of the substrate, the first carbon nanotube layer including multiple carbon nanotubes extending in a first direction;

patterning the first carbon nanotube layer to form multiple first blocks spaced apart from one another;

forming a first electrode on a surface of each of the multiple first blocks, each first electrode being electrically connected to a respective one of the multiple first blocks;

forming a separate layer to cover the first carbon nanotube layer and the first electrode;

preparing a second carbon nanotube layer and laying the second carbon nanotube layer on a surface of the separate layer, the second carbon nanotube layer including multiple carbon nanotubes extending in a second direction intersecting with the first direction;

patterning the second carbon nanotube layer to form multiple second blocks spaced apart from one another, wherein the first block does not overlap the second block in a direction perpendicular to the substrate; and forming a second electrode on a surface of each of the multiple second blocks, each second electrode being electrically connected to a respective one of the multiple second blocks.

A method for fabricating a composite substrate is further provided according to the present disclosure. The method includes:

preparing a substrate including a first surface and a second surface arranged opposite to each other;

laying a first carbon nanotube layer on the first surface, the first carbon nanotube layer including multiple carbon nanotubes extending in a first direction;

patterning the first carbon nanotube layer to form multiple first blocks spaced apart from one another;

forming a first electrode on a surface of each of the multiple first blocks, each first electrode being electrically connected to a respective one of the multiple first blocks;

laying a second carbon nanotube layer on the second surface, the second carbon nanotube layer including multiple carbon nanotubes extending in a second direction intersecting with the first direction;

patterning the second carbon nanotube layer to form multiple second blocks spaced apart from one another, where a projection of the first block onto a surface of the substrate does not overlap a projection of the second block onto the surface of the substrate in a direction perpendicular to the substrate; and forming a second electrode on a surface of each of the multiple second blocks, each second electrode being electrically connected to a respective one of the multiple second blocks.

It can be seen from the above description that, the composite substrate according to the present disclosure includes a carbon nanotube layer including multiple blocks, each of the blocks includes multiple carbon nanotubes extending in the same direction, and the extending directions of the carbon nanotubes in at least two of the blocks are different. The carbon nanotube has a polarizing feature to transmit a light of which a polarization direction is perpendicular to the extending direction of the carbon nanotube, and absorb a light of which a polarization direction is parallel to the extending direction of the carbon nanotube; hence, each block has a polarizing feature, and a polarization direction of the block depends on the extending direction of the carbon nanotube in the block. In addition, the carbon nanotube layer includes blocks in which the extending directions of the carbon nanotubes are different, hence, polarization directions of the blocks are different, and the composite substrate has a local polarizing feature. In a case that the composite substrate is used to prepare a color filter substrate or a TFT array substrate, a local polarization of the TFT array substrate or the color filter substrate may be achieved.

In the liquid crystal display panel according to the present disclosure, the above-described composite substrate serves as the TFT array substrate and/or the color filter substrate, thereby achieving the local polarization of the liquid crystal display panel and improving a display performance of the liquid crystal display panel.

With the fabrication method according to the present disclosure, the composite substrate having the local polarizing feature may be prepared with a simple fabrication process and a low cost.

BRIEF DESCRIPTION OF THE DRAWINGS

The drawings to be used in the description of the embodiments of the disclosure or the conventional technology are described briefly as follows, so that the technical solutions according to the embodiments of the present disclosure or according to the conventional technology may become clearer. It is apparent that the drawings in the following description only illustrate some embodiments of the present disclosure. For those skilled in the art, other drawings may be obtained according to these drawings without any creative work.

DETAILED DESCRIPTION OF THE INVENTION

Technical solutions according to embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

Figure 1:
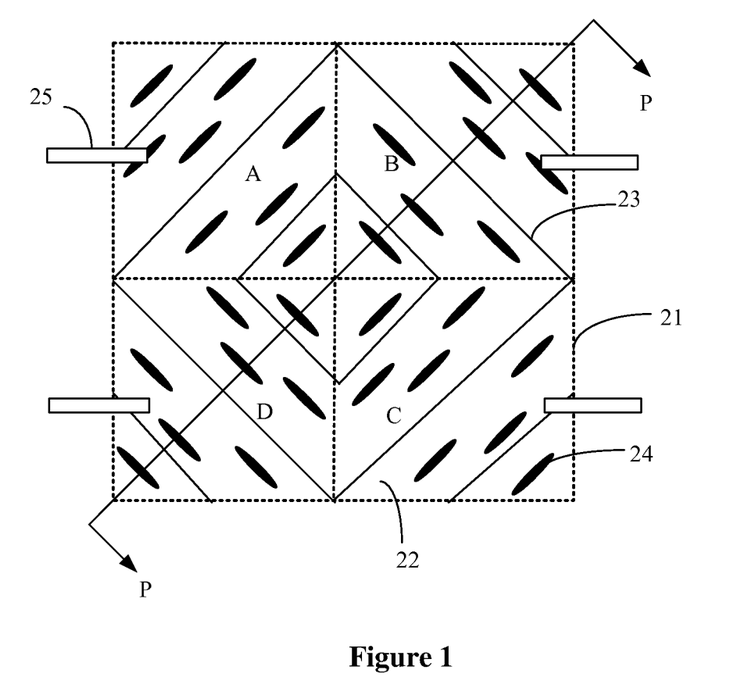
FIG. 1 is a top view of a composite substrate according to an embodiment of the present disclosure.
Figure 2:
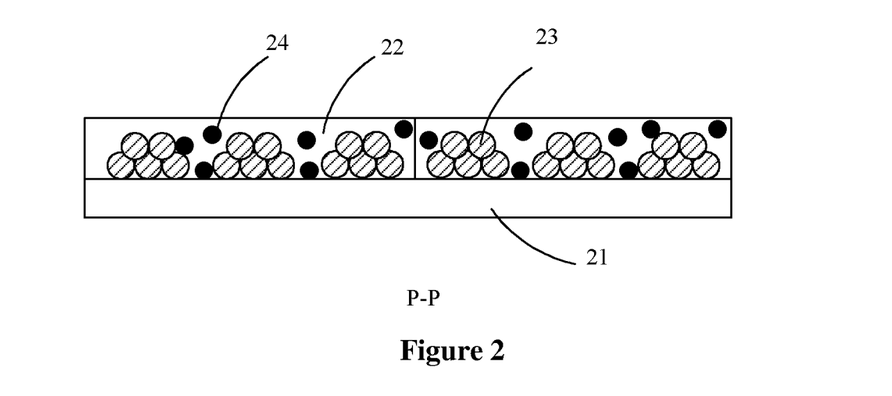
FIG. 2 is a sectional view of the composite substrate shown in FIG. 1 in a P-to-P direction.

References are made to FIG. 1 and FIG. 2. FIG. 1 is a top view of a composite substrate according to an embodiment of the present disclosure, and FIG. 2 is a sectional view of the composite substrate shown in FIG. 1 in a P-to-P direction. The composite substrate has a local polarizing feature.

The composite substrate includes: a substrate 21, multiple electrodes 25 insulated from each other and a carbon nanotube layer 23. The carbon nanotube layer 23 is divided into multiple blocks in a plane where the carbon nanotube layer 23 is located. In FIG. 2, taking four blocks for example, the blocks are represented with dotted line boxes, and one dotted line box represents one block. The four blocks includes blocks A, B, C and D.

Each block includes multiple carbon nanotubes extending in the same direction. In the composite substrate, the extending directions of the carbon nanotubes in at least two blocks are different. As shown in FIG. 2, an extending direction of the carbon nanotube in the block A is different from an extending direction of the carbon nanotube in the block B, an extending direction of the carbon nanotube in the block C is different from an extending direction of the carbon nanotube in the block D, the extending direction of the carbon nanotube in the block A is the same as the extending direction of the carbon nanotube in the block C, and the extending direction of the carbon nanotube in the block B is the same as the extending direction of the carbon nanotube in the block D. Optionally, the composite substrate may further include a photoalignment matrix material 22, and the carbon nanotube layer 23 is adhered to a surface of the substrate 21 with the photoalignment matrix material 22. Each of the electrodes 25 is electrically connected to a respective one of the blocks.

The substrate 21 mainly serves as a support, and may be made of a flexible or hard transparent material, such as glass, quartz, diamond or plastic. In an embodiment, the substrate 21 may be a glass plate. Optionally, the substrate 21 may be a TFT array substrate, a color filter substrate or other structures of a liquid crystal display panel.

The carbon nanotube layer 23 includes at least one layer of carbon nanotube film. The carbon nanotube film may be a self-supported film structure directly pulled from a carbon nanotube array. The term "self-supported film structure" means that the carbon nanotube film can be hanged to maintain its film state by supporting forces provided by only two opposite edges, without a supporter of a large area.

Figure 3:
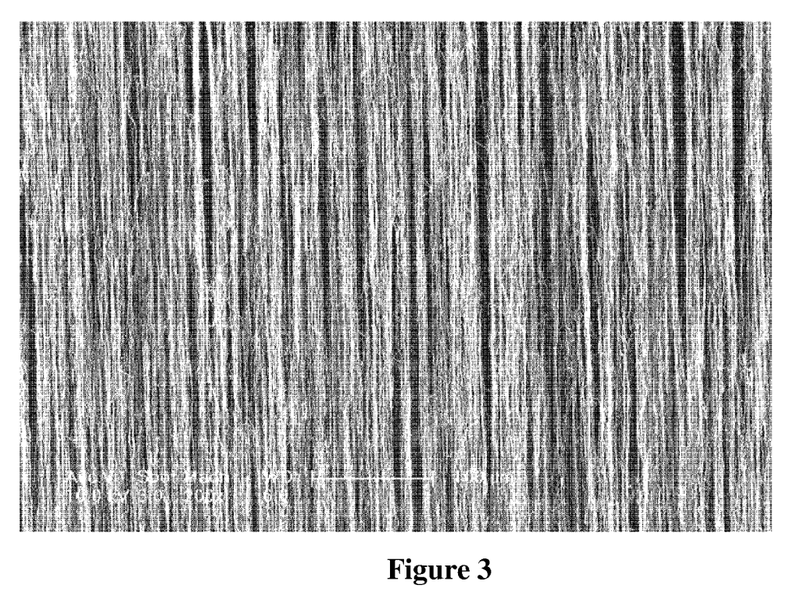
FIG. 3 is a schematic structural diagram of a carbon nanotube film under a microscope.

FIG. 3 is a schematic structural diagram of a carbon nanotube film under a microscope. The carbon nanotube film includes multiple carbon nanotubes preferably oriented in the same direction and arranged in parallel to a surface of the carbon nanotube film. Each carbon nanotube is end-to-end connected to a neighbor carbon nanotube in the extending direction of the carbon nanotube via van der Waals forces and is tightly connected to a neighbor carbon nanotube in a direction perpendicular to the extending direction of the carbon nanotube via van der Waals forces, to form a continuous self-supported film structure.

Since the carbon nanotubes in the carbon nanotube film extend in the same direction, multiple grooves extending in the same direction may be formed between the carbon nanotubes arranged in parallel. The groove may be used for an initial alignment of liquid crystal molecules. The carbon nanotube film has a thickness in a range between 0.5 nm and 100 µm, a width of the carbon nanotube film depends on a size of the carbon nanotube array from which the carbon nanotube film is pulled, and a length of the carbon nanotube film is not limited.

The carbon nanotube film has a good transparence, and a light transmittance of the carbon nanotube film may be above 80%, since the carbon nanotube film has a small thickness. After the carbon nanotube film is thinned by a laser, the light transmittance of the carbon nanotube film may be above 90%. Therefore, the carbon nanotube film of the carbon nanotube layer according to an embodiment of the present disclosure is a laser-thinned carbon nanotube film, hence the carbon nanotube layer has a high light transmittance.

In addition, since the carbon nanotubes in the carbon nanotube film extend in the same direction, the carbon nanotube film is resistivity anisotropic, that is, the carbon nanotube film has a minimal resistance in the extending direction of the carbon nanotube and has a maximal resistance in a direction perpendicular to the extending direction of the carbon nanotube. The sheet resistance of the carbon nanotube film in the direction perpendicular to the extending direction of the carbon nanotube is more than ten times the sheet resistance of the carbon nanotube film in the direction parallel to the extending direction of the carbon nanotube. Therefore, each of the blocks may serve as an electrode.

Moreover, the carbon nanotubes have a polarizing feature, to transmit a light of which a polarization direction is perpendicular to the extending direction of the carbon nanotube and absorb a light of which a polarization direction is parallel to the extending direction of the carbon nanotube. Therefore, the carbon nanotube film has a polarizing feature, and a polarization direction of the carbon nanotube film depends on the extending direction of the carbon nanotube in the carbon nanotube film. Each of the blocks has a polarizing feature, polarization directions of blocks with the same extending direction of the carbon nanotube are the same, and polarization directions of blocks with different extending directions of carbon nanotubes are different.

The composite substrate may have different polarization directions and have a local polarizing feature since the composite substrate includes blocks with different extending directions of carbon nanotubes. In a case that the composite substrate serves as a TFT array substrate or a color filter substrate, a local polarization of the TFT array substrate or a local polarization of the color filter substrate may be achieved. In the embodiment of the present disclosure, a polarization direction of a block indicates a light polarization direction of the block.

The carbon nanotubes may include one or more of a single-walled carbon nanotube, a double-walled carbon nanotube and a multi-walled carbon nanotube. The carbon nanotubes have a diameter in a range between 0.5 nm and 50 nm and the carbon nanotubes have a length in a range between 50 nm and 5 mm. Preferably, the carbon nanotubes have a length in a range between 100 µm and 900 µm. The carbon nanotubes may be laid in parallel without a space to form a carbon nanotube layer of a large area, or arranged in a stack manner to form a carbon nanotube layer of a large thickness. As long as it is ensured that all carbon nanotubes in the same block extend in the same direction, the carbon nanotubes may be arranged in any manner.

In a case that one layer of carbon nanotube film exists in a block, the carbon nanotube film has a high light transmittance, a low fabrication cost and the carbon nanotube film is laid simply. Therefore, in an embodiment, each of the blocks is preferably configured to include only one layer of carbon nanotube film. It should be noted that, one layer of carbon nanotube film may include multiple carbon nanotubes stacked in thickness, and the number of carbon nanotubes stacked at different locations are not necessarily the same.

An included angle formed between an orientation of the photoalignment matrix material 22 and an extending direction of the carbon nanotube in the block is in a range from 0 degree to 90 degrees, inclusively. Preferably, the included angle is set to be 0 degree.

The composite substrate further includes: a polarizing material 24 dispersedly mixed in the photoalignment matrix material 22. In each of the blocks, a polarization direction of the polarizing material is the same as the extending direction of the carbon nanotube in the block, to improve a polarization performance of the block.

In the composite substrate according to an embodiment of the present disclosure, the polarizing material is a dichroic organic dye. The dichroic organic dye includes one or more of an azoic dye, an anthraquinone dye, a biphenyl dye, triphenyl dioxazine and derivative dyes, a monomethine dye, a polymethine dye and a polycyclic dye.

The dichroic organic dye may be oriented due to an orientation arrangement of the polarizing material under an irradiation of a polarized ultraviolet light. Besides, due to dichroism of the dichroic organic dye, under an irradiation of a natural light, the dichroic organic dye may transmit a light in one polarization direction and block a light in other directions. Hence, the dichroic organic dye has the same polarizing feature as that of a polarizer, and the polarization direction of the dichroic organic dye depends on a molecule arrangement direction of the dichroic organic dye.

By setting the molecule arrangement direction of the dichroic organic dye in each block, the molecule arrangement direction is the same as the extending direction of the carbon nanotube in the block, and the polarizing performance of the block is further improved.

In the composite substrate, the polarizing material 24 is a dichroic organic dye with a dichroic ratio larger than or equal to 7. In this case, the polarization performance of the block may be improved greatly with the polarizing material 24.

A structure of the azoic dichroic organic dye may be represented as:

Optionally, an electron donating group/electron withdrawing group is adsorbed on an end of a molecule (preferably a terminal of the molecule) of the dichroic organic dye. The differences between polarization directions of blocks may be achieved precisely, a precision of a polarization in a composite substrate region may be improved and the composite substrate has a better stability since the dichroism of the dichroic organic dye is increased by introducing the electron donating group/electron withdrawing group. In a case that the dichroic organic dye with the dichroism ratio larger than or equal to 7 is used, the polarizing performance of the composite substrate is optimal if the molecule arrangement direction of the dichroic organic dye is the same as the extending direction of the carbon nanotube.

Since multiple carbon nanotubes in the block extend in the same direction, multiple grooves arranged in parallel are formed between the carbon nanotubes arranged in parallel. The groove may be used for an initial alignment of liquid crystal molecules. Alignment directions of liquid crystal molecules are different for blocks with different extending directions of carbon nanotubes, hence the composite substrate may be used for a local alignment of the liquid crystal molecules. In a case that the composite substrate serves as a color filter substrate or TFT array substrate, the color filter where an R group connected to an N atom in (3) may be:

Furthermore, the polarizing material may further include materials with structures of benzidine, diphenylureas, stilbenes, dinaphthyl amines, J-acids or anthraquinones, to improve the polarizing performance of the polarizing material.

substrate or TFT array substrate may have a local alignment feature, and the liquid crystal molecules are aligned in different directions for regions of carbon nanotubes with different extending directions.

An alignment performance of the block may be improved with the photoalignment matrix material by setting the included angle between the orientation of the photoalignment matrix material and the extending direction of the carbon nanotube in the block to be in a range from 0 degree to 90 degrees, inclusively. The photoalignment matrix material may have a determined photoalignment orientation under an irradiation of a polarized ultraviolet light, and the photoalignment orientation may be determined by controlling a polarization direction and energy of the polarized ultraviolet light. Optionally, the included angle between the orientation of the photoalignment matrix material and the extending direction of the carbon nanotube in the block is set to be 0 degree, to improve the alignment performance of the block maximally in the embodiment of the present disclosure.

If the color filter substrate or TFT array substrate needs to have a whole alignment performance, only a new alignment layer is formed on a surface of the photoalignment matrix material.

The photoalignment matrix material 22 includes one or more of cellulose triacetate, polyimide and polyamic acid. In the embodiment, the photoalignment matrix material 22 is polyimide.

The photoalignment matrix material 22 is in a liquid state initially and penetrates into spaces between adjacent carbon nanotubes, and covers a surface of the carbon nanotube layer 23 far away from the substrate 21. Multiple grooves are formed on the surface of the photoalignment matrix material 22 far away from the substrate 21, and an extending direction of the groove is parallel to the extending direction of the carbon nanotube. In this case, after the photoalignment matrix material is solidified, a microstructure of the surface of the photoalignment matrix material 22 may be the same as a microstructure of the surface of the carbon nanotube layer, the photoalignment matrix material 22 may be cooperated with the carbon nanotube layer 23, thereby significantly improving the alignment performance of the blocks.

By irradiating the photoalignment matrix material 22 with the polarized ultraviolet light, the molecule arrangement direction of the polarizing material inside the photoalignment matrix material 22 is the same as the extending direction of the carbon nanotube, thereby further improving the polarization performance of the blocks. If it is unnecessary to perform a local alignment on the liquid crystal molecules, the photoalignment matrix material 22 may be flattened after molecules of the polarizing material in the photoalignment matrix material are aligned, and then a whole-aligned alignment layer is formed on the surface of the composite substrate.

The composite substrate according to an embodiment of the present disclosure has advantages as follows. Since the carbon nanotube film has a regular microstructure and is modified with the photoalignment matrix material, each of the blocks may have a good alignment performance and may be adhered to a surface of an element with the photoalignment matrix material without an additional adhesive. The blocks also have a good electrical conductivity, a good light transmittance and a good polarizing performance. Accordingly, the composite substrate also has the above-described performances, and may serve as an alignment layer for a local alignment and may serve as a polarizer for a local polarization. The blocks may serve as a touch electrode or a shielding electrode due to the electrical conductivity of the blocks.

It can be seen from the above description that, the composite substrate according to the embodiment of the present disclosure has the polarizing feature and the alignment feature, and may serve as a polarizer and an alignment layer. Furthermore, a local polarization and a local alignment may be achieved with the composite substrate.

In a case that the substrate of the composite substrate is a TFT array substrate, the TFT array substrate may server as a polarizer and an alignment layer, hence the TFT array substrate has a simpler structure and a lower fabrication cost compared with the conventional TFT array substrate for which the polarizer and the alignment layer are prepared separately.

In a case that the substrate of the composite substrate is a color filter substrate, the color filter substrate may serve as a polarizer and an alignment layer, hence the color filter substrate has a simpler structure and a lower fabrication cost compared with the conventional color filter substrate for which the polarizer and the alignment layer are prepared separately. Since the alignment layer and the polarizer are integrated into the same structure in the composite substrate, the thickness and fabrication cost of a liquid crystal display panel may be reduced significantly if the composite substrate is used for preparing a liquid crystal display panel.

The polarizing performance may be further improved since the carbon nanotube layer may be adhered to a transparent substrate with the photoalignment matrix material without an additional adhesive.

In addition, since each of the blocks is made of the carbon nanotube film, the blocks may be electrically conductive. If the blocks are insulated from each other, in a case that the composite substrate serves as a TFT array substrate, the carbon nanotube layer may serve as a common electrode layer. In this case, if a touch detection signal is input to the carbon nanotube layer, the carbon nanotube layer is used for touch detection; if a common voltage signal is input to each of the blocks, the carbon nanotube layer is used for image display. In a case that the composite substrate serves as a color filter substrate, the carbon nanotube layer serves as a shielding electrode. In this case, a determined shielding voltage is input to each block as a shielding unit, preferably, the common voltage signal may be used as the shielding voltage.

Figure 4:
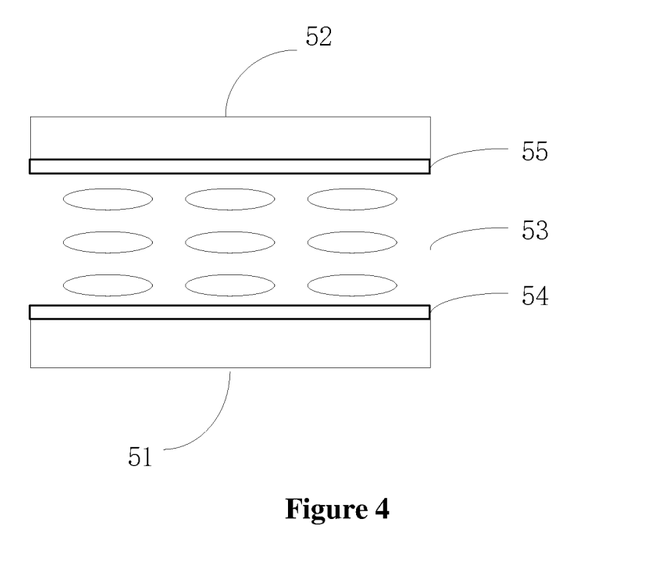
FIG. 4 is a schematic structural diagram of a liquid crystal display panel according to an embodiment of the present disclosure.

Based on the above-described embodiment, a liquid crystal display panel is further provided according to an embodiment of the present disclosure, referring to FIG. 4. FIG. 4 is a schematic structural diagram of a liquid crystal display panel according to the embodiment of the present disclosure. The liquid crystal display panel includes: a TFT array substrate 51 and a color filter substrate 52 arranged opposite to each other; and a liquid crystal layer 53 arranged between the TFT array substrate 51 and the color filter substrate 52.

The liquid crystal display panel further includes multiple electrodes insulated from each other and a carbon nanotube layer 54. The electrodes are not shown in FIG. 4.

The carbon nanotube layer 54 is divided into multiple blocks insulated from each other in a plane where the carbon nanotube layer 54 is located. Each of the blocks includes multiple carbon nanotubes extending in the same direction, and the extending directions of the carbon nanotubes in at least two blocks are different. Each of the electrodes is electrically connected to a respective one of the blocks.

In the liquid crystal display panel, a structure of the composite substrate according to the above-described embodiment may be formed with the carbon nanotube layer 54 and the TFT array substrate 51 as the substrate. The carbon nanotube layer 54 may be adhered to a surface of the TFT array substrate 51 with a photoalignment matrix material. A polarizing material may be mixed into the photoalignment matrix material to further improve the polarization performance. In this case, the carbon nanotube layer 54 may serve as a common electrode layer, and features of a polarizer and a common layer are achieved with the carbon nanotube layer 54, thereby reducing a thickness and fabrication cost of the display panel. In a case that the carbon nanotube layer 54 serves as the common electrode layer, the carbon nanotube layer 54 may serves as a touch driver and a display driver since the multiple blocks are included in the carbon nanotube layer 54.

The liquid crystal display panel shown in FIG. 4 further includes a carbon nanotube layer 55. The carbon nanotube layer 55 is divided into multiple blocks insulated from each other in a plane where the carbon nanotube layer 55 is located. Each of the blocks includes multiple carbon nanotubes extending in the same direction, and the extending directions of the carbon nanotubes in at least two blocks are different. A local polarization of a color filter substrate 52 may be achieved with the carbon nanotube layer 55. Furthermore, an electrode may be arranged to be electrically connected to each block of the carbon nanotube layer 55. The electrode is used for providing a shielding voltage to a respective block, to shield an electromagnetic interference and ensure a display effect. The shielding voltage may be a common voltage signal. In this case, both a shielding electrode feature and a polarizer feature of the color filter substrate 52 may be achieved with the carbon nanotube layer 55, thereby reducing a thickness and a fabrication cost of the liquid crystal display panel.

In a case that each of the color filter substrate 52 and the TFT array substrate 51 of the liquid crystal display panel has a carbon nanotube layer, the blocks of the carbon nanotube layer 55 are opposite to the blocks of the carbon nanotube layer 54 respectively in a direction perpendicular to the TFT array substrate 51, and the extending directions of carbon nanotubes in blocks opposite to each other are perpendicular, to control a light to pass through the color filter substrate 52 and the TFT array substrate 51 cooperated with liquid crystal molecules, thereby achieving an image display.

A method for fabricating the above-described composite substrate is further provided according to an embodiment of the present disclosure, referring to FIG. 5 to FIG. 10. FIG. 5 to FIG. 10 are schematic diagrams of a flow of a fabrication method according to the embodiment of the present disclosure, and the fabrication method includes steps S11 to S18.

Figure 5:
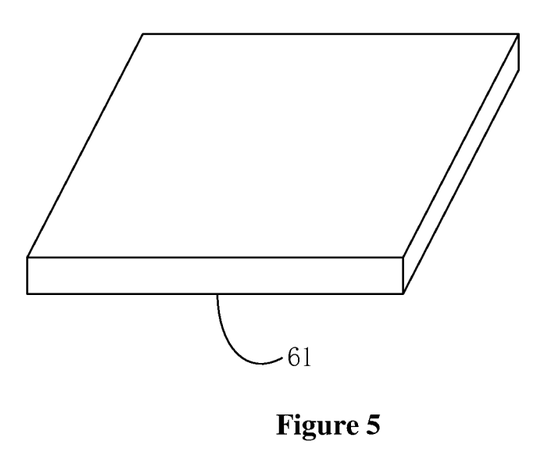
FIG. 5 to FIG. 10 are schematic diagrams of a flow of a fabrication method according to an embodiment of the present disclosure.

In step S11, a substrate 61 is prepared as shown in FIG. 5.

Figure 6:
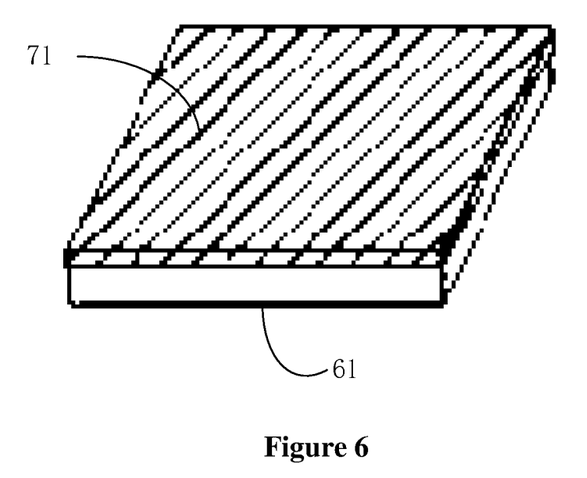

In step S12, a first carbon nanotube layer 71 is prepared and laid on a surface of the substrate 61, as shown in FIG. 6. The first carbon nanotube layer 71 includes multiple carbon nanotubes extending in a first direction.

Before the first carbon nanotube layer 71 is laid, the method further includes: coating the surface of the substrate 61 with a first photoalignment matrix material and laying the first carbon nanotube layer 71 on the first photoalignment matrix material to adhere and fix the first carbon nanotube layer 71.

Figure 7:
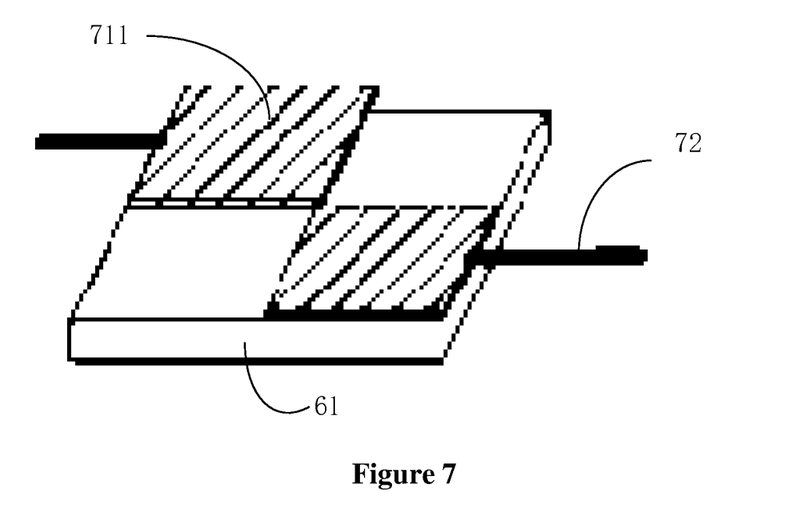

In step S13, the first carbon nanotube layer 71 is patterned to form multiple first blocks 711 spaced apart from one another, as shown in FIG. 7.

Before the first carbon nanotube layer 71 is patterned, the method further includes: solidifying the first photoalignment matrix material. Hence the first carbon nanotube layer 71 is adhered to the surface of the substrate 61 with the first photoalignment matrix material, and the solidified first photoalignment matrix material has a determined photoalignment orientation.

An included angle between a photoalignment orientation of the first photoalignment matrix material and the extending direction of the carbon nanotube of the first carbon nanotube layer 71 is in a range from 0 degree to 90 degrees, inclusively. Preferably, the included angle is 0 degree.

In step S14, a first electrode 72 is formed on a surface of each of the first blocks 711, and each first electrode 72 is electrically connected to a respective one of the first blocks 711, as shown in FIG. 7.

Figure 8:
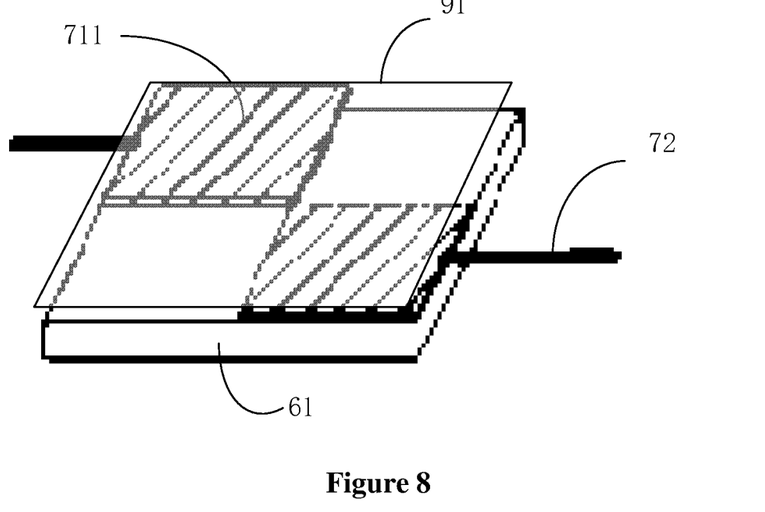

In step S15, a separate layer 91 is formed to cover the first carbon nanotube layer 71 and the first electrodes 72, as shown in FIG. 8.

The separate layer 91 is made of a transparent material.

Figure 9:
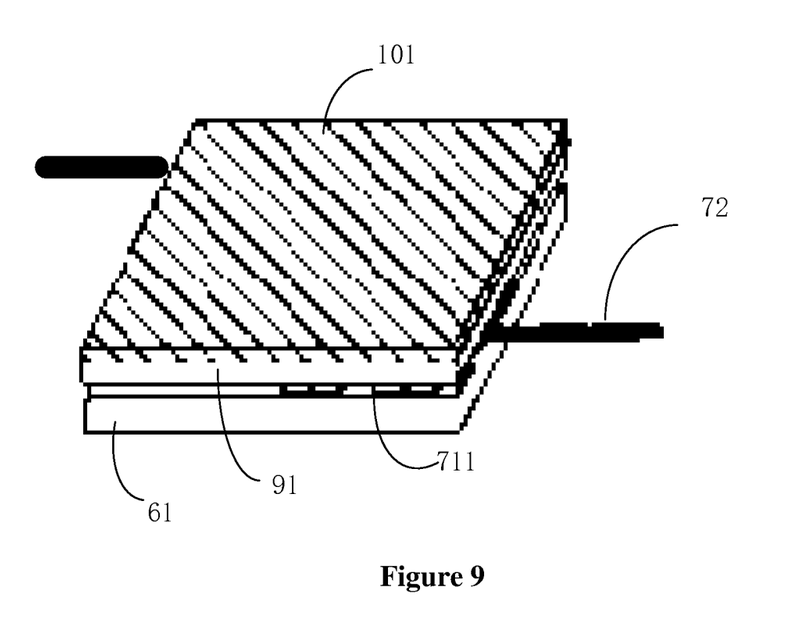

In step S16, a second carbon nanotube layer 101 is prepared and laid on a surface of the separate layer 91, as shown in FIG. 9. The second carbon nanotube layer 101 includes multiple carbon nanotubes extending in a second direction intersecting with the first direction.

Before the second carbon nanotube layer 101 is laid, the method further includes: coating the surface of the insulated separate layer 91 with a second photoalignment matrix material, and laying the second carbon nanotube layer on the second photoalignment matrix material to adhere and fix the second carbon nanotube layer 101.

Figure 10:
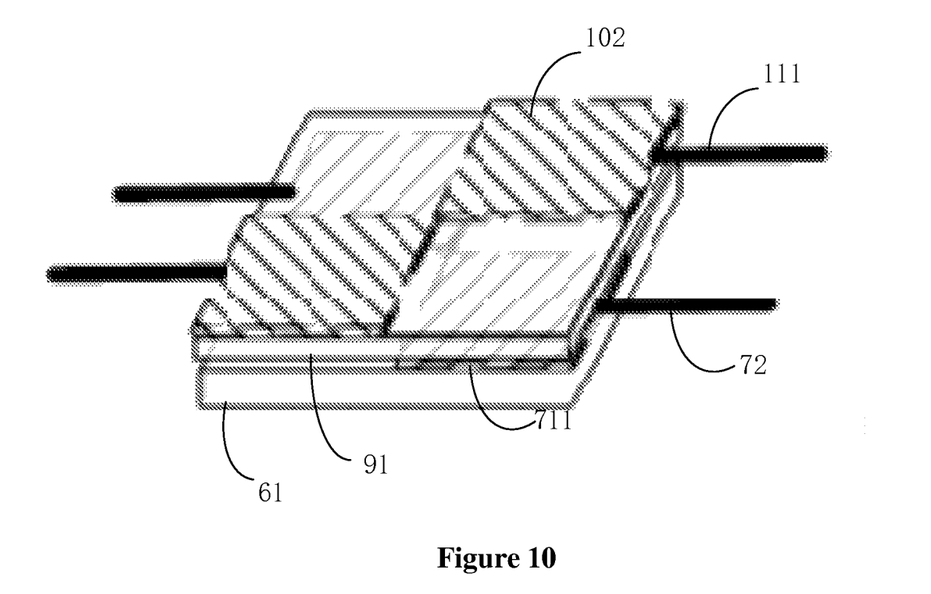

In step S17, the second carbon nanotube layer 101 is patterned to form multiple second blocks 102 spaced apart from one another, as shown in FIG. 10. In a direction perpendicular to the substrate, the first block 711 does not overlap the second block 102.

Before the second carbon nanotube layer 101 is patterned, the method further includes: solidifying the second photoalignment matrix material to adhere the second carbon nanotube layer 101 to the surface of the separate layer 91 with the second photoalignment matrix material. Hence the second carbon nanotube layer 101 is adhered to the surface of the substrate after the solidification, and the solidified second photoalignment matrix material has a determined photoalignment orientation.

An included angle between a photoalignment orientation of the second photoalignment matrix material and the extending direction of the carbon nanotube of the second carbon nanotube layer is in a range from 0 degree to 90 degrees, inclusively. Preferably, the included angle is set to be 0 degree.

The first photoalignment matrix material or the second photoalignment matrix material is solidified to form the determined orientation by irradiating the first photoalignment matrix material or the second photoalignment matrix material with a polarized ultraviolet light. A polarization direction of the polarized ultraviolet light for irradiating the first photoalignment matrix material is parallel to the first direction and a polarization direction of the polarized ultraviolet light for irradiating the second photoalignment matrix material is parallel to the second direction.

The first photoalignment matrix material and/or the second photoalignment matrix material are mixed with a dichroic organic dye. A molecule arrangement direction of the dichroic organic dye is the same as the extending direction of the carbon nanotube in a respective block after being irradiated by a polarized ultraviolet light. Hence a polarization performance of the block is improved with the dichroic organic dye.

In step S18, a second electrode 111 is formed on a surface of each of the second blocks 102, and each second electrode 111 is electrically connected to a respective one of the blocks 102, as shown in FIG. 10.

In the composite substrate according to the above-described embodiment, blocks with different extending directions of carbon nanotubes are located on the same side of the substrate. In another embodiment, two blocks with different extending directions of carbon nanotubes may also be respectively arranged on two sides of the substrate, as shown in FIG. 11 and FIG. 12.

Figure 11:
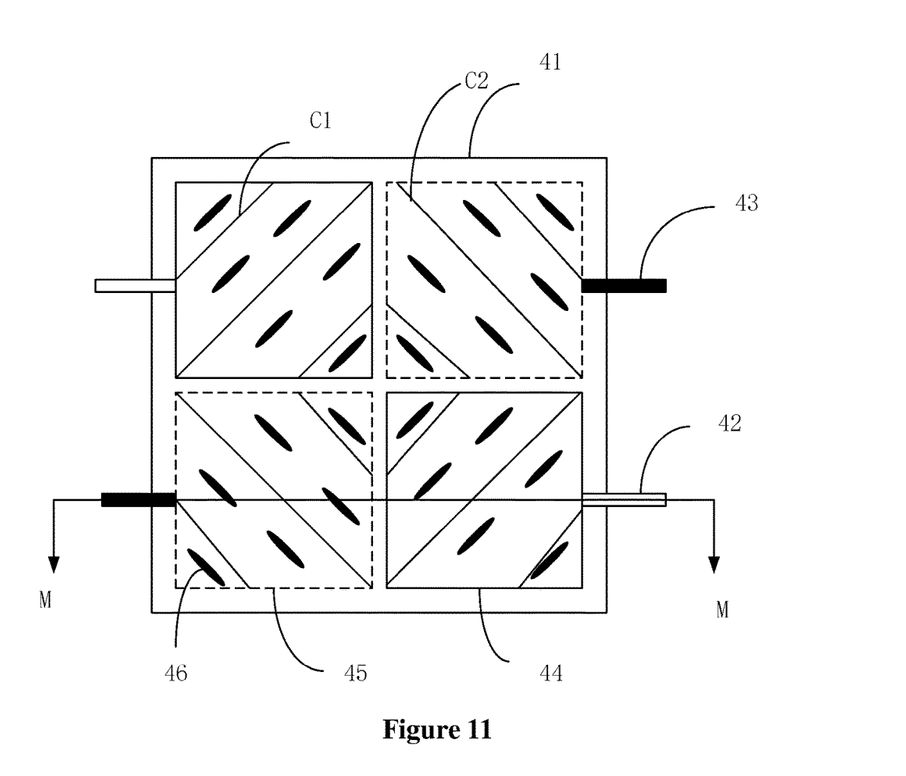
FIG. 11 is a top view of a composite substrate according to an embodiment of the present disclosure.
Figure 12:
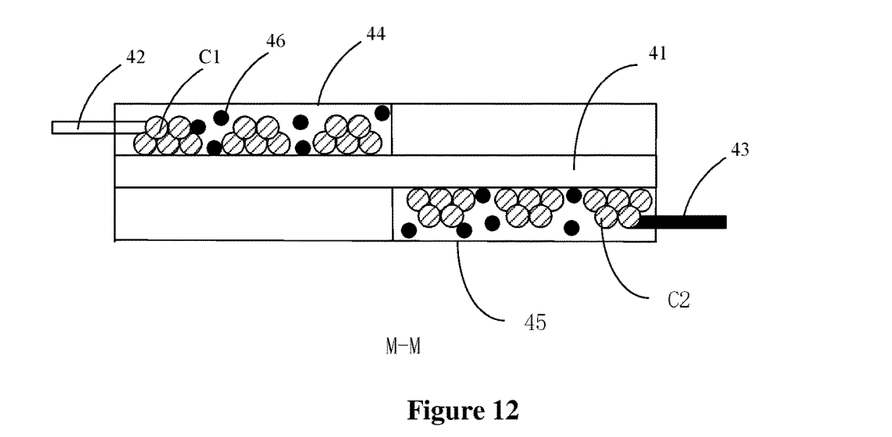
FIG. 12 is a sectional view of the composite substrate shown in FIG. 11 in an M-to-M direction.

Based on the composite substrate according to the above-described embodiment, a composite substrate is further provided according to an embodiment of the present disclosure, referring to FIG. 11 and FIG. 12. FIG. 11 is a top view of a composite substrate according to an embodiment of the present disclosure, and FIG. 12 is a sectional view of the composite substrate shown in FIG. 11 in an M-to-M direction. The composite substrate includes: a substrate 41, multiple first electrodes 42 insulated from each other, multiple second electrodes 43 insulated from each other, a first carbon nanotube layer C1 and a second carbon nanotube layer C2. The first carbon nanotube layer C1 is arranged on a first surface of the substrate 41, and the second carbon nanotube layer C2 is arranged on a second surface of the substrate 41 which is opposite to the first surface.

The carbon nanotube layer C1 includes multiple carbon nanotubes extending in a first direction and is divided into multiple first blocks 44 insulated from each other in a plane where the carbon nanotube layer C1 is located, and each of the first electrodes 42 is electrically connected to a respective one of the first blocks 44. The second carbon nanotube layer C2 includes multiple carbon nanotubes extending in a second direction intersecting with the first direction and is divided into multiple second blocks 45 insulated from each other in a plane where the second carbon nanotube layer C2 is located, and each of the second electrodes 43 is electrically connected to a respective one of the second blocks 45. A projection of the first carbon nanotube layer C1 onto a surface of the substrate 41 does not overlap a projection of the second carbon nanotube layer C2 onto the surface of the substrate 41 in a direction perpendicular to the substrate 41.

Optionally, the composite substrate further includes: a first photoalignment matrix material and a second photoalignment matrix material. The first carbon nanotube layer C1 is adhered to the first surface with the first photoalignment matrix material, and the second carbon nanotube layer C2 is adhered to the second surface with the second photoalignment matrix material. A photoalignment orientation of the first photoalignment matrix material is parallel to the first direction and a photoalignment orientation of the second photoalignment matrix material is parallel to the second direction.

In order to improve the polarization performance of the composite substrate, the composite substrate further includes a first polarizing material and a second polarizing material. The first polarizing material is mixed into the first photoalignment matrix material and a polarization direction of the first polarizing material is parallel to the first direction. The second polarizing material is mixed into the second photoalignment matrix material and a polarization direction of the second polarizing material is parallel to the second direction.

The difference between the embodiment referring to FIG. 11 and FIG. 12 and the embodiment referring to FIG. 1 and FIG. 2 is in that: the first blocks and the second blocks are respectively arranged on two sides of the substrate. Similarly, a local polarization may be achieved for the blocks and the blocks may serve as common electrodes or shielding electrodes. The implementation principle may refer to the above descriptions, which is not described herein.

Figure 13:
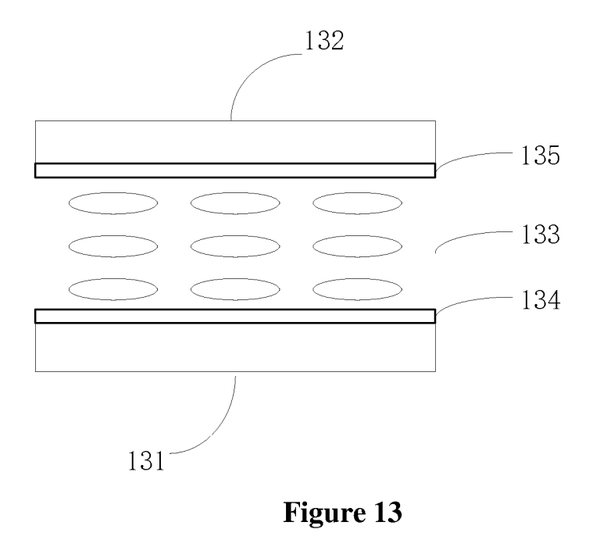
FIG. 13 is a schematic structural diagram of a liquid crystal display panel according to an embodiment of the present disclosure.

A liquid crystal display panel is further provided according to an embodiment of the present disclosure, referring to FIG. 13. FIG. 13 is a schematic structural diagram of a liquid crystal display panel according to the embodiment of the present disclosure. The liquid crystal display panel includes: a TFT array substrate 131 and a color filter substrate 132 arranged opposite to each other, and a liquid crystal layer 133 between the TFT array substrate 131 and the color filter substrate 132. The liquid crystal display panel further includes the composite substrate shown in FIG. 11 and FIG. 12, where the number of the composite substrate is one or two.

In a case that the number of the composite substrate is one, the composite substrate is arranged on a surface of the TFT array substrate 131 or on a surface of the color filter substrate 132. In a case that the number of the composite substrate is two, one of the composite substrates is arranged on the surface of the TFT array substrate 131 and the other of the composite substrates is arranged on the surface of the color filter substrate 132.

The liquid crystal display panel shown in FIG. 13 includes two composite substrates, namely a first composite substrate 134 arranged on the surface of the TFT array substrate 131 and a second composite substrate 135 arranged on the surface of the color filter substrate 132. A one-to-one correspondence exists between blocks of the two composite substrates in a direction perpendicular to the TFT array substrate 131, and extending directions of carbon nanotubes in two corresponding blocks of the two composite substrates are perpendicular.

Similarly, a local polarization may be achieved for the liquid crystal display panel. The composite substrate, while serving as a polarizer, may serve as a common electrode or a shielding electrode to reduce a thickness and fabrication cost of the liquid crystal display panel. The local polarization or local polarizing in the disclosure means that polarization directions are different in different areas.

Figure 14:
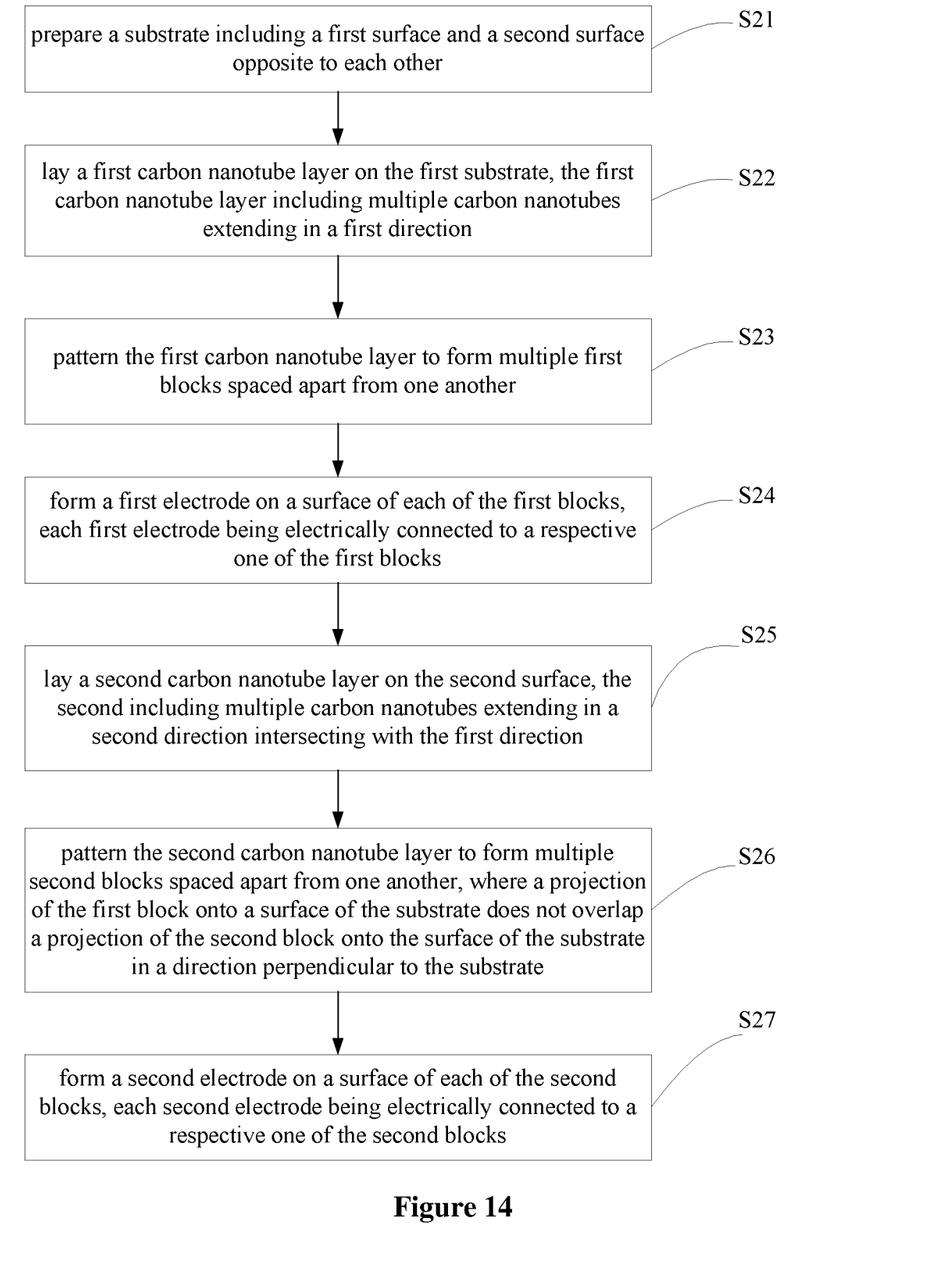
FIG. 14 is a flowchart of a fabrication method according to the present disclosure.

A method for fabricating the composite substrate as shown in FIG. 11 and FIG. 12 is further provided according to an embodiment of the present disclosure, referring to FIG. 14. FIG. 14 is a flowchart of a method for fabricating a composite substrate according to the embodiment of the present disclosure. The fabrication method includes steps S21 to S27.

In step S21, a substrate including a first surface and a second surface opposite to each other is prepared.

In step S22, a first carbon nanotube layer is laid on the first surface, and the first carbon nanotube layer includes multiple carbon nanotubes extending in a first direction.

Before the first carbon nanotube layer is laid, the method further includes: coating the first surface with a first photoalignment matrix material and laying the first carbon nanotube layer on the first photo alignment matrix material.

In step S23, the first carbon nanotube layer is patterned to form multiple first blocks spaced apart from one another.

Before the first carbon nanotube layer is patterned, the method further includes: solidifying the first photoalignment matrix material. Hence, the first carbon nanotube layer is adhered to the first surface of the substrate with the first photoalignment matrix material.

In step S24, a first electrode is formed on a surface of each of the first blocks, and each first electrode is electrically connected to a respective one of the first blocks.

In step S25, a second carbon nanotube layer is laid on the second surface, and the second carbon nanotube layer includes multiple carbon nanotubes extending in a second direction intersecting with the second direction.

Before the second carbon nanotube layer is laid, the method further includes: coating the second surface with a second photoalignment matrix material and laying the second carbon nanotube layer on the second photoalignment matrix material.

In step S26, the second carbon nanotube layer is patterned to form multiple second blocks spaced apart from one another. A projection of the first block onto a surface of the substrate does not overlap a projection of the second block onto the surface of the substrate in a direction perpendicular to the substrate.

Before the second carbon nanotube layer is patterned, the method further includes solidifying the second photoalignment matrix material. Hence, the second carbon nanotube layer is adhered to the second surface of the substrate with the second photoalignment matrix material.

In step S27, a second electrode is formed on a surface of each of the second blocks and each second electrode is electrically connected to a respective one of the second blocks.

With the above descriptions of the disclosed embodiments, those skilled in the art may practice or use the present disclosure. Various modifications to the embodiments are apparent for those skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

What is claimed is:

1. A composite substrate, comprising:
a substrate, a plurality of electrodes insulated from each other and a carbon nanotube layer arranged on a surface of the substrate,
wherein the carbon nanotube layer is divided into a plurality of blocks insulated from each other in a plane where the carbon nanotube layer is located; each of the plurality of blocks comprises a plurality of carbon nanotubes extending in a same direction and extending directions of the plurality of the carbon nanotubes in at least two of the plurality of blocks are different; and each of the plurality of electrodes is electrically connected to a respective block of the plurality of blocks.

2. The composite substrate according to claim 1, further comprising: a photoalignment matrix material, wherein the carbon nanotube layer is adhered to the surface of the substrate with the photoalignment matrix material.

3. The composite substrate according to claim 2, wherein an included angle formed between an orientation of the photoalignment matrix material and an extending direction of a carbon nanotube of the plurality of the carbon nanotube is in a range from 0 degree to 90 degrees, inclusively, for each of the plurality of blocks respectively.

4. The composite substrate according to claim 3, wherein the included angle formed between the orientation of the photoalignment matrix material and the extending direction of the carbon nanotube equals to 0 degree.

5. The composite substrate according to claim 2, further comprising: a polarizing material mixed dispersedly in the photoalignment matrix material.

6. The composite substrate according to claim 5, wherein a polarization direction of the polarizing material is the same as the extending direction of the carbon nanotube in each of the plurality of blocks.

7. The composite substrate according to claim 5, wherein the polarizing material is a dichroic organic dye with a dichroic ratio larger than or equal to 7.

8. A liquid crystal display panel, comprising: a TFT array substrate and a color filter substrate arranged opposite to each other, and a liquid crystal layer arranged between the TFT array substrate and the color filter substrate; and the liquid crystal display panel further comprising: a plurality of electrodes insulated from each other and a carbon nanotube layer,
wherein the carbon nanotube layer is divided into a plurality of blocks insulated from each other in a plane where the carbon nanotube layer is located; each of the plurality of blocks comprises a plurality of carbon nanotubes extending in a same direction and extending directions of the plurality of the carbon nanotubes in at least two of the plurality of blocks are different; and each of the plurality of electrodes is electrically connected to a respective block of the plurality of blocks.

9. A composite substrate, comprising:
a substrate, a plurality of first electrodes insulated from each other, a plurality of second electrodes insulated from each other, a first carbon nanotube layer and a second carbon nanotube layer,
wherein the first carbon nanotube layer is arranged on a first surface of the substrate, the second carbon nanotube layer is arranged on a second surface of the substrate, and the first surface is opposite to the second surface; and
the first carbon nanotube layer comprises a plurality of carbon nanotubes extending in a first direction and is divided into a plurality of first blocks insulated from each other in a plane where the first carbon nanotube layer is located, and each of the plurality of first electrodes is electrically connected to a respective block of the plurality of first blocks; the second carbon nanotube layer comprises a plurality of carbon nanotubes extending in a second direction intersecting with the first direction and is divided into a plurality of second blocks insulated from each other in a plane where the second carbon nanotube layer is located, and each of the plurality of second electrodes is electrically connected to a respective one of the plurality of second blocks; a projection of the first carbon nanotube layer onto a surface of the substrate does not overlap a projection of the second carbon nanotube layer onto the surface of the substrate in a direction perpendicular to the substrate.

10. The composite substrate according to claim 9, further comprising: a first photoalignment matrix material and a second photoalignment matrix material, wherein the first carbon nanotube layer is adhered to the first surface with the first photoalignment matrix material and the second carbon nanotube layer is adhered to the second surface with the second photoalignment matrix material.

11. The composite substrate according to claim 10, wherein an orientation of the first photoalignment matrix material is parallel to the first direction and an orientation of the second photoalignment matrix material is parallel to the second direction.

12. The composite substrate according to claim 11, further comprising: a first polarizing material and a second polarizing material, wherein the first polarizing material is mixed into the first photoalignment matrix material and a polarization direction of the first polarizing material is parallel to the first direction; the second polarizing material is mixed into the second photoalignment matrix material and a polarization direction of the second photoalignment matrix material is parallel to the second direction.

13. A liquid crystal display panel, comprising: a TFT array substrate and a color filter substrate arranged opposite to each other; a liquid crystal layer arranged between the TFT array substrate and the color filter substrate; and the liquid crystal display panel further comprising: a composite substrate, the number of the composite substrate being one or two, the composite substrate comprising: a substrate, a plurality of first electrodes insulated from each other, a plurality of second electrodes insulated from each other, a first carbon nanotube layer and a second carbon nanotube layer,
- wherein the first carbon nanotube layer is arranged on a first surface of the substrate, the second carbon nanotube layer is arranged on a second surface of the substrate, and the first surface is opposite to the second surface; and
- the first carbon nanotube layer comprises a plurality of carbon nanotubes extending in a first direction and is divided into a plurality of first blocks insulated from each other in a plane where the first carbon nanotube layer is located, and each of the plurality of first electrodes is electrically connected to a respective one of the plurality of first blocks; the second carbon nanotube layer comprises a plurality of carbon nanotubes extending in a second direction intersecting with the first direction and is divided into a plurality of second blocks insulated from each other in a plane where the second carbon nanotube layer is located, and each of the plurality of second electrodes is electrically connected to a respective one of the plurality of second blocks; a projection of the first carbon nanotube layer onto a surface of the substrate does not overlap a projection of the second carbon nanotube layer onto the surface of the substrate in a direction perpendicular to the substrate;
  - wherein in a case that the number of the composite substrate is one, the composite substrate is arranged on a surface of the TFT array substrate or a surface of the color filter substrate; in a case that the number of the composite substrate is two, one of the composite substrates is arranged on the surface of the TFT array substrate and the other of the composite substrates is arranged on the surface of the color filter substrate.

14. A method for fabricating a composite substrate, comprising:
- preparing a substrate;
- preparing a first carbon nanotube layer and laying the first carbon nanotube layer on a surface of the substrate, wherein the first carbon nanotube layer comprises a plurality of carbon nanotubes extending in a first direction;
- patterning the first carbon nanotube layer to form a plurality of first blocks spaced apart from one another;
- forming a first electrode on a surface of each of the plurality of first blocks, wherein each first electrode is electrically connected to a respective one of the plurality of first blocks;
- forming a separate layer to cover the first carbon nanotube layer and the first electrode;
- preparing a second carbon nanotube layer and laying the second carbon nanotube layer on a surface of the separate layer, wherein the second carbon nanotube layer comprises a plurality of carbon nanotubes extending in a second direction intersecting with the first direction;
- patterning the second carbon nanotube layer to form a plurality of second blocks spaced apart from one another, wherein the first block does not overlap the second block in a direction perpendicular to the substrate; and
- forming a second electrode on a surface of each of the plurality of second blocks, wherein each second electrode is electrically connected to a respective one of the plurality of second blocks.

15. The method according to claim 14, wherein before the process of laying the first carbon nanotube layer, the method further comprises:
- coating the surface of the substrate with a first photoalignment matrix material and laying the first carbon nanotube layer on the first photoalignment matrix material.

16. The method according to claim 15, wherein before the process of patterning the first carbon nanotube layer, the method further comprises: solidifying the first photoalignment matrix material to adhere the first carbon nanotube layer to the surface of the substrate with the first photoalignment matrix material.

17. The method according to claim 16, wherein before the process of laying the second carbon nanotube layer, the method further comprises:
- coating the surface of the separate layer with a second photoalignment matrix material and laying the second carbon nanotube layer on the second photoalignment matrix material.

18. The method according to claim 17, wherein before the process of patterning the second carbon nanotube layer, the method further comprises: solidifying the second photoalignment matrix material to adhere the second carbon nanotube layer to the surface of the separate layer with the second photoalignment matrix material.

19. The method according to claim 18, wherein the process of solidifying the first photoalignment matrix material or the process of solidifying the second photoalignment matrix material comprise:
- irradiating the first photo alignment matrix material or the second photoalignment matrix material with a polarized ultraviolet light, wherein the first photoalignment matrix material or the second photoalignment matrix material is solidified to have a determined orientation.

20. The method according to claim 19, wherein a polarization direction of the polarized ultraviolet light for irradiating the first photoalignment matrix material is parallel to the first direction and a polarization direction of the polarized ultraviolet light for irradiating the second photoalignment matrix material is parallel to the second direction.

* * * * *